(12) United States Patent
Amick

(10) Patent No.: US 9,239,183 B2
(45) Date of Patent: Jan. 19, 2016

(54) METHOD FOR REDUCING TRANSIENT DEFROST NOISE ON AN OUTDOOR SPLIT SYSTEM HEAT PUMP

(71) Applicant: Carrier Corporation, Farmington, CT (US)

(72) Inventor: James Amick, Coatesville, IN (US)

(73) Assignee: CARRIER CORPORATION, Farmington, CT (US)

( * ) Notice: Subject to any disclaimer, the term of this patent is extended or adjusted under 35 U.S.C. 154(b) by 346 days.

(21) Appl. No.: 13/773,279

(22) Filed: Feb. 21, 2013

(65) Prior Publication Data

US 2013/0291571 A1 Nov. 7, 2013

Related U.S. Application Data

(60) Provisional application No. 61/642,078, filed on May 3, 2012.

(51) Int. Cl.
| | |
|---|---|
| *F25D 21/06* | (2006.01) |
| *F25B 47/02* | (2006.01) |
| *F25B 49/02* | (2006.01) |
| *F25B 30/02* | (2006.01) |
| *F24F 11/00* | (2006.01) |

(52) U.S. Cl.
CPC .............. *F25D 21/06* (2013.01); *F25B 47/025* (2013.01); *F25B 49/02* (2013.01); *F24F 2011/0087* (2013.01); *F25B 30/02* (2013.01); *F25B 2600/112* (2013.01); *F25B 2600/23* (2013.01)

(58) Field of Classification Search
CPC ..... F25D 21/002; F25D 21/008; F25D 21/06; F25B 13/00; F25B 2600/23
USPC ....................................... 62/80–82
See application file for complete search history.

(56) References Cited

U.S. PATENT DOCUMENTS

| | | | |
|---|---|---|---|
| 2,001,027 | A | 5/1935 | Kitzmiller |
| 2,178,807 | A | 11/1939 | Ploeger |
| 3,070,972 | A | 1/1963 | Atchison |
| 4,086,779 | A | 5/1978 | Lewis |
| 4,102,391 | A | 7/1978 | Noland et al. |

(Continued)

FOREIGN PATENT DOCUMENTS

| | | |
|---|---|---|
| CN | 101140105 A | 3/2008 |
| EP | 1041286 A2 | 10/2000 |

(Continued)

*Primary Examiner* — Allen Flanigan
*Assistant Examiner* — Filip Zec
(74) *Attorney, Agent, or Firm* — Cantor Colburn LLP

(57) ABSTRACT

A method for reducing perceived defrost noise in a heat pump is provided. The method may include energizing a fan configured to urge a heat transfer medium across a heat exchanger, and initiating a defrost cycle to warm the heat exchanger. Initiating the defrost cycle may include de-energizing a compressor fluidly coupled to the heat exchanger, and delaying for a first delay period with the fan energized and the compressor de-energized. Initiating the defrost cycle may also include energizing a reversing valve after the first delay period, to reverse a flow of a refrigerant flow between the compressor and the heat exchanger, and delaying for a second delay period with the fan energized, the compressor de-energized, and the reversing valve energized. Initiating the defrost cycle may also include de-energizing the fan. The method may also include defrosting the heat pump during the defrost cycle, and terminating the defrost cycle.

19 Claims, 5 Drawing Sheets

(56) References Cited

U.S. PATENT DOCUMENTS

| | | |
|---|---|---|
| 4,178,767 A | 12/1979 | Shaw |
| 4,215,555 A | 8/1980 | Cann et al. |
| 4,338,790 A | 7/1982 | Saunders et al. |
| 4,373,350 A | 2/1983 | Noland |
| 4,406,133 A | 9/1983 | Saunders et al. |
| 4,439,995 A | 4/1984 | McCarty |
| 4,565,070 A | 1/1986 | Raymond |
| 4,662,184 A | 5/1987 | Pohl et al. |
| 4,694,657 A | 9/1987 | Vaughn |
| 4,727,727 A | 3/1988 | Reedy |
| 4,745,766 A | 5/1988 | Bahr |
| 4,887,436 A | 12/1989 | Enomoto et al. |
| 4,910,966 A | 3/1990 | Levine et al. |
| 4,916,912 A | 4/1990 | Levine et al. |
| 4,951,473 A | 8/1990 | Levine et al. |
| 4,974,417 A | 12/1990 | Levine et al. |
| 4,974,418 A | 12/1990 | Levine et al. |
| 5,052,191 A | 10/1991 | Shapiro |
| 5,065,584 A | 11/1991 | Byczynski et al. |
| 5,095,711 A | 3/1992 | Marris et al. |
| 5,156,010 A | 10/1992 | Inoue et al. |
| 5,257,506 A | 11/1993 | DeWolf et al. |
| 5,269,151 A * | 12/1993 | Dinh .................. 62/81 |
| 5,285,646 A | 2/1994 | TaeDuk |
| 5,319,943 A | 6/1994 | Bahel et al. |
| 5,363,669 A * | 11/1994 | Janke et al. ............ 62/155 |
| 5,479,785 A | 1/1996 | Novak |
| 5,483,804 A * | 1/1996 | Ogawa et al. ........... 62/153 |
| 5,727,395 A | 3/1998 | Guo et al. |
| 5,931,009 A | 8/1999 | Choi |
| 6,334,321 B1 | 1/2002 | Said et al. |
| 6,508,072 B1 | 1/2003 | Kanazawa et al. |
| 6,945,059 B1 | 9/2005 | Reason et al. |
| 7,707,842 B2 | 5/2010 | Concha et al. |
| 7,716,936 B2 * | 5/2010 | Bailey et al. ............ 62/151 |
| 7,856,836 B2 | 12/2010 | Aoki |
| 7,883,024 B2 | 2/2011 | Nakayama et al. |
| 2004/0098997 A1 | 5/2004 | Lee et al. |
| 2004/0103676 A1 | 6/2004 | Lee et al. |
| 2005/0183427 A1 * | 8/2005 | Dudley et al. ........... 62/80 |
| 2007/0180838 A1 | 8/2007 | Shah |
| 2009/0266093 A1 | 10/2009 | Aoki |
| 2011/0100041 A1 | 5/2011 | Crawford et al. |
| 2011/0197616 A1 | 8/2011 | Nishii et al. |
| 2011/0209488 A1 | 9/2011 | Yamada et al. |
| 2011/0209489 A1 | 9/2011 | Lawson, Sr. et al. |
| 2011/0302937 A1 | 12/2011 | Bujak, Jr. |
| 2012/0043056 A1 | 2/2012 | Shimazu et al. |

FOREIGN PATENT DOCUMENTS

| | | |
|---|---|---|
| JP | 58028936 A | 2/1983 |
| JP | 6313653 A | 11/1994 |
| JP | 7174441 A | 7/1995 |
| JP | 8261609 A | 10/1996 |
| JP | 8271101 A | 10/1996 |
| JP | 10253205 A | 9/1998 |
| JP | 11201594 A | 7/1999 |
| JP | 2003240391 A | 8/2003 |
| JP | 2004233015 A | 8/2004 |
| JP | 2004301390 A | 10/2004 |
| JP | 2005147609 A | 6/2005 |
| JP | 2006071197 A | 3/2006 |
| JP | 2007278536 A | 10/2007 |
| JP | 2008039273 A | 2/2008 |
| JP | 2008116156 A | 5/2008 |
| JP | 2009014215 A | 1/2009 |
| JP | 2009047385 A | 3/2009 |
| JP | 2009168290 A | 7/2009 |
| JP | 2010181052 A | 8/2010 |
| KR | 2002073964 A | 9/2002 |

* cited by examiner

METHOD FOR REDUCING TRANSIENT DEFROST NOISE ON AN OUTDOOR SPLIT SYSTEM HEAT PUMP

CROSS-REFERENCE TO RELATED APPLICATIONS

This application claims priority to U.S. Provisional Patent Application Ser. No. 61/642,078, filed on May 3, 2012, which is incorporated herein by reference in its entirety.

BACKGROUND

Heat pumps are used in a variety of settings, for example, in HVAC systems that provide a desired air temperature in a facility. Such heat pumps commonly include a compressor, evaporator, expansion valve, and condenser. The heat pumps input work to the refrigerant, e.g., by driving the compressor, thereby enabling the refrigerant to move heat from a colder heat reservoir to a warmer heat sink.

Some heat pumps are provided as "split" systems, in which the condenser (in heating applications) is disposed inside of the facility, while compressor, evaporator, and expansion valve are disposed outside the facility. This allows for efficient moving of heat from the outside (reservoir) to the inside (sink).

"Frosting" of the outside unit is a common problem seen in such heat pump split systems when implemented in colder climates. Frosting is caused by moisture accumulation on the evaporator, typically in temperatures just above freezing, for example, between 0° C. and 5° C. The accumulated moisture is then frozen by the cold refrigerant coursing through the evaporator and obstructs the flow of air past the evaporator, which reduces operating efficiency. Frosting can also be seen in warmer, humid climates, where the heat pump is configured to cool the facility and the evaporator is disposed inside the facility, while the condenser is outside.

One way in which frosting is avoided is by providing periodic defrost cycles in the heat pump. The defrost cycle typically proceeds by reversing the flow of the refrigerant in the heat pump, such that the condenser and evaporator conceptually switch places. The result is that the refrigerant warms the evaporator, thereby avoiding such frost accumulation.

However, initiating and terminating defrost cycles by reversing the refrigerant flow presents challenges. Efficient operation of the heat pump relies on a relatively high compression ratio between the high-pressure side (downstream of the compressor and upstream of the expansion valve) and the low-pressure side (upstream of the compressor and downstream of the expansion valve). With such a high pressure differential, reversing the refrigerant flow to initiate or terminate a defrost cycle often results in a rush of reversing refrigerant flowing from the high-pressure side to the low-pressure side. This can result in valve screech, "groaning," "swooshing," and a variety of other noises that give users the impression that high quality, working parts are either broken or poorly made.

What is needed is a method for reducing perceived defrost noises in a heat pump.

SUMMARY

Embodiments of the disclosure may provide an exemplary method for reducing perceived defrost noise in a heat pump. The method may include energizing a fan configured to urge a heat transfer medium across a heat exchanger, and initiating a defrost cycle to warm the heat exchanger. Initiating the defrost cycle may include de-energizing a compressor fluidly coupled to the heat exchanger, and delaying for a first delay period with the fan energized and the compressor de-energized. Initiating the defrost cycle may also include energizing a reversing valve after the first delay period, to reverse a flow of a refrigerant flow between the compressor and the heat exchanger, such that the refrigerant warms the heat exchanger, and delaying for a second delay period with the fan energized, the compressor de-energized, and the reversing valve energized. Initiating the defrost cycle may also include de-energizing the fan. The method may also include defrosting the heat pump during the defrost cycle, and terminating the defrost cycle.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Figure 1:
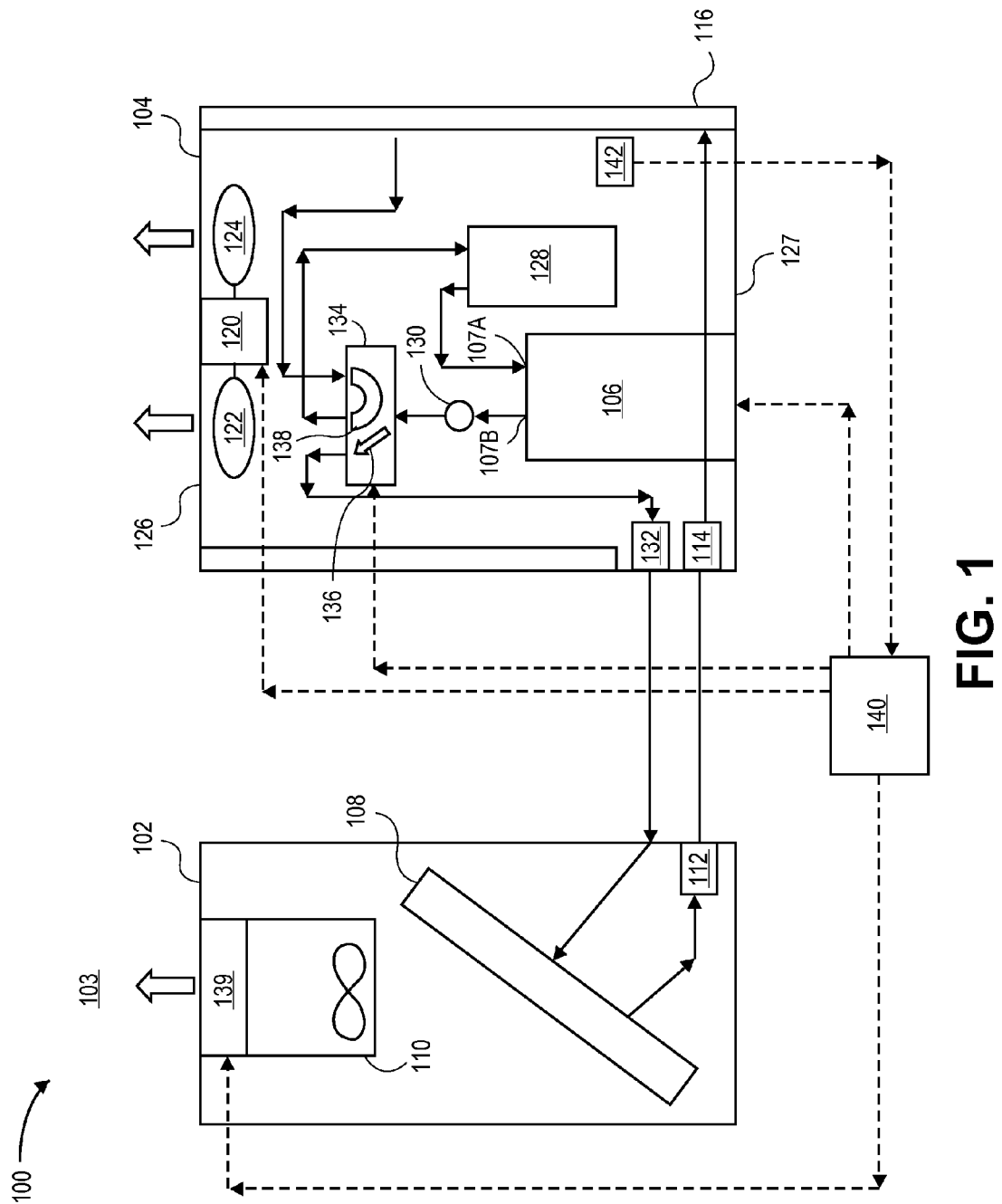
FIG. 1 illustrates a schematic view of an exemplary heat pump with a reversing valve in a de-energized state, according to an embodiment.

FIG. 1 illustrates an exemplary heat pump 100, according to an embodiment. The heat pump 100 may be a split system, having an indoor portion 102 positioned inside a facility 103 and an outdoor portion 104 positioned outside the facility 103; however, in various embodiments, the heat pump 100 may instead be housed in a single casing and/or disposed partially inside and partially outside, or either completely inside or outside the facility 103. FIG. 1 may illustrate default or "normal" operation of the heat pump 100, with the heat pump 100 being configured to heat the facility 103; however, it will be readily appreciated that the heat pump 100 can be reversed to cool the facility 103, as shown in and described in further detail below with reference to FIG. 2.

The heat pump 100 includes a compressor 106, which may be located, for example, in the outdoor portion 104. The compressor 106 includes an inlet 107a configured to receive a lower-pressure refrigerant and an outlet 107b configured to discharge a higher-pressure refrigerant. The refrigerant can be or include, without limitation, Freon, R134a, propane, butane, methane, R410A, carbon dioxide, nitrogen, argon, other organic or HCFC refrigerants, combinations thereof, or the like.

The compressor 106 can be any suitable single or multi-stage compressor, for example, a screw compressor, reciprocating compressor, centrifugal compressor, scroll compressor, axial-flow compressor, or the like. The compressor 106 may also be representative of multiple discrete or cooperative compressors. Further, the compressor 106 may include a motor (not shown), which may be electrically powered to drive the compressor 106. In some embodiments, however, other energy sources may be employed to drive the compressor 106, such as, for example, natural gas.

The compressor 106 may be "energized" and "de-energized," for example, by controlling the power to the motor. In a single-stage embodiment of the compressor 106, power can be provided to the motor, which in turn, supplies mechanical energy to the compressor 106, thereby "energizing" the compressor 106. Further, power can be turned off to the motor, or the motor can be mechanically decoupled from the compressive portions of the compressor 106, such that the compressor 106 is "de-energized" and therefore ceases to compress refrigerant.

In multi-stage or multi-unit embodiments of the compressor 106, the compressor 106 can be "de-energized" by stopping the supply of mechanical energy to one, some, or all of the compression stages (or units) of the compressor 106, for example, by decoupling the motor from one or more of the stages. In other embodiments, each unit or stage of the compressor 106 may include a separate motor, and thus de-energizing the compressor 106 may proceed by de-energizing one, some, or all of the separate motors. Accordingly, as the term is used herein, "de-energized" includes causing one, some, or all stages of a multi-stage compressor 106 and/or one, some, or all units of a multi-unit compressor 106 to substantially cease operation. Similarly, the a multi-stage and/or multi-unit compressor 106 may be "energized" by driving one, some, or all of the stages and/or units of the compressor 106.

The heat pump 100 also includes a first heat exchanger 108, which may be disposed in the indoor portion 102, and may be fluidly coupled to the compressor 106. The first heat exchanger 108 may be any suitable type of heat exchanger configured to transfer heat between a refrigerant and air or another medium (e.g., water). For example, the first heat exchanger 108 may include one or more coils of thermally conductive material, such as copper, aluminum, alloys thereof, combinations thereof, or the like. In other embodiments, the first heat exchanger 108 may be or additionally include a shell-and-tube heat exchanger, a printed circuit heat exchanger, a plate-fin heat exchanger, combinations thereof, or the like. The air (or other medium) may be motivated past the first heat exchanger 108 via a blower 110, which may be any suitable air moving device, including one or more axial, radial, or centrifugal fans, blowers, pumps, compressors, combinations thereof, or the like.

The heat pump 100 may further include at least one expansion device, for example, an indoor expansion device 112 positioned in the indoor portion 102, and an outdoor expansion device 114 positioned in the outdoor portion 104. At least one of the indoor and outdoor expansion devices 112, 114 may be fluidly coupled to the first heat exchanger 108. The expansion devices 112, 114 may each be or include one or more types of thermal expansion valves (TEVs), Joule-Thomson valves, or the like. In other embodiments, one or both of the expansion devices 112, 114 may be a turbine or other type of expander. Although not shown, the heat pump 100 may include one or more valves and/or bypass lines to enable bypass of the indoor and/or outdoor expansion devices 112, 114, for example, according to whether the heat pump 100 is set to cool a facility or heat a facility, as will be described in greater detail below.

The heat pump 100 may also include a second heat exchanger 116 fluidly coupled at least one of the indoor and outdoor expansion devices 112, 114. In an embodiment, the second heat exchanger 116 may be disposed about the outer extent of the outdoor portion 104 of the heat pump 100, as schematically depicted in FIG. 1. However, in other embodiments, the second heat exchanger 116 may be disposed in any location within, around, and/or proximal to the outdoor portion 104. The second heat exchanger 116 may be any suitable type of heat exchanger configured to transfer heat between a refrigerant and air or another medium (e.g., water). For example, the second heat exchanger 116 may include one or more coils of thermally conductive material, such as copper, aluminum, alloys thereof, combinations thereof, or the like. In some embodiments, the second heat exchanger 116 may be or additionally include a shell-and-tube heat exchanger, a printed circuit heat exchanger, a plate-fin heat exchanger, combinations thereof, or the like.

The heat pump 100 may include a fan 118 to urge or otherwise motivate the air (or another medium) past the second heat exchanger 116. The fan 118 may include a motor 120 and one or more blades 122, 124, and may be, in at least one embodiment, positioned proximal a top 126 of the outdoor portion 104. The fan 118 may be configured to draw air into the outdoor portion 104 past the second heat exchanger 116, and out through the top 126. In other embodiments, the fan 118 may be positioned proximal a bottom 127 of the outdoor portion 104, or any point between the top 126 and bottom 127 and may be configured to push or pull air through the top 126, the bottom 127, sides or any combination thereof. Further, the fan 118 may be or include one or more of any suitable type of axial, radial, or centrifugal fan, pump, blower, or compressor, combinations thereof, or the like.

The heat pump 100 may also include an accumulator 128 disposed upstream from the compressor 106. The accumulator 128 may be a pressurized vessel configured to store extra refrigerant, which may provide refrigerant inventory control in the heat pump 100 and/or may store excess refrigerant. The accumulator 128 may be inline with the compressor 106, or may be selectively branched off upstream of the compressor inlet 107a, for example, by a three-way valve (not shown). The heat pump 100 may further include a muffler 130 to attenuate the propagation of noise from the compressor 106. The muffler 130 may be any suitable noise-attenuating device. Further, one or more service valves 132 may be disposed, from a fluid-flow standpoint, between the compressor 106 and the first heat exchanger 108. The service valve 132 may be or include one or more gate valves, ball valves, check valves, or any other valves which are operable to facilitate decoupling the indoor and outdoor portions 102, 104 for maintenance, repair, replacement, installation, or the like.

The heat pump 100 may also include a reversing valve 134, according to an embodiment. The reversing valve 134 may be positioned in the outdoor portion 104 and, from a fluid flow standpoint, between the compressor 106 and the first heat exchanger 108 and between the second heat exchanger 116 and the compressor 106. The reversing valve 134 may include two flowpaths therethrough: a first flowpath 136 and a second flowpath 138. In one or more embodiments, the first and second flowpaths 136, 138 may be discrete, preventing fluid flowing through the first flowpath 136 from mixing with fluid flowing through the second flowpath 138 and vice versa. In other embodiments, some intermixing between the first and second flowpaths 136, 138 may be allowed.

Further, the reversing valve 134 may have a default state and an energized state. For example, FIG. 1 may illustrate the default state of the reversing valve 134. In the illustrated embodiment, when in the default state, the reversing valve 134 may be configured such that the first flowpath 136 fluidly connects the compressor outlet 107b (e.g., via the muffler 130) to the first heat exchanger 108 and the second flowpath 138 fluidly connects the second heat exchanger 116 to the compressor inlet 107a (e.g., via the accumulator 128).

The heat pump 100 may also include an auxiliary heater 139 positioned in the indoor portion 102, proximal to the blower 110. The auxiliary heater 139 may be an electrical resistance or inductive heater, a gas heater or furnace, steam boiler and/or radiator, a geothermal heater, a combination thereof, or the like. The auxiliary heater 139 may be configured to provide supplemental heat for the air moved into the facility 103 by the blower 110 during a defrost cycle, to avoid undesired "cold blow" (i.e., directing cold air into the facility 103, when the facility 103 is to be heated to a temperature above ambient air temperature).

The heat pump 100 may also include a controller 140 and a temperature sensor 142, which may be coupled together such that the controller 140 is configured to receive a signal from the temperature sensor 142. The temperature sensor 142 may be a thermistor, thermocouple, thermostat, infrared sensor, combinations thereof, or the like, and may be in contact with or disposed closely proximal to the second heat exchanger 116 so as to gauge a temperature of the second heat exchanger 116. The controller 140 and the temperature sensor 142 may be disposed within the outdoor portion 104, or outside thereof.

The controller 140 may be or include one or more programmable logic controllers and may be additionally coupled with the compressor 106, reversing valve 134, fan 118, auxiliary heater 139, and any other components of the heat pump 100 so as to communicate therewith. The controller 140 may be configured to receive an input from the temperature sensor 142 and provide output signals to one or more of the compressor 106, reversing valve 134, fan 118, and auxiliary heater 139. Such output signals may control whether each component is energized or de-energized.

Figure 2:
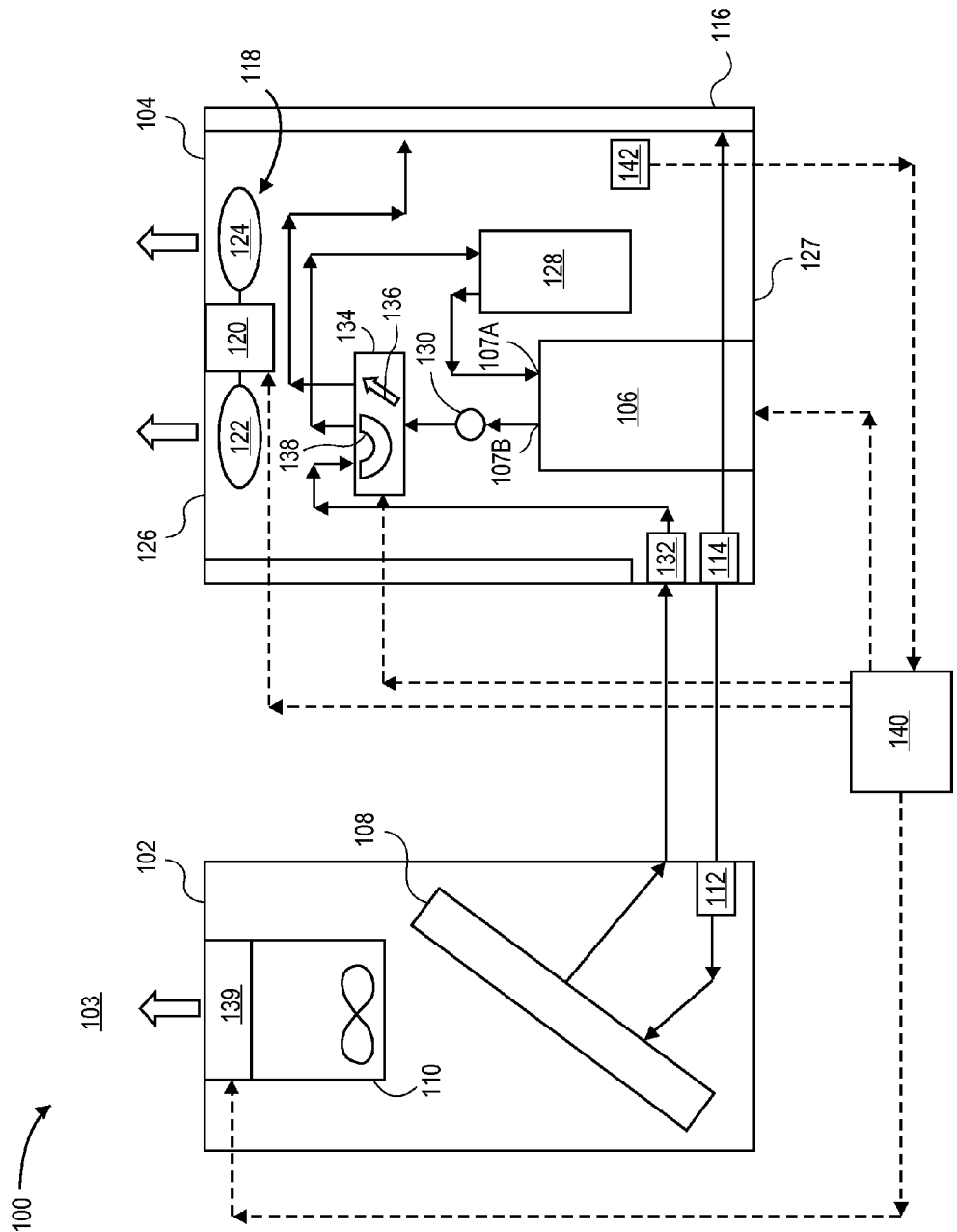
FIG. 2 illustrates a schematic view of the heat hump with the reversing valve in an energized state, according to an embodiment.

FIG. 2 illustrates the heat pump 100 of FIG. 1, according to an embodiment, with the reversing valve 134 in an "energized" position. As shown, in the energized position, the first flowpath 136 may connect the compressor outlet 107b (e.g., via the muffler 130) to the second heat exchanger 116, while the second flowpath 138 connects the first heat exchanger 108 to the compressor inlet 107a (e.g., via the accumulator 128).

It will be appreciated that the reversing valve 134, conceptually at least, is flipped in FIG. 2 as compared to FIG. 1, such that the first and second flowpaths 136, 138 switch positions. However, it will be appreciated that this is only intended to conceptually represent the position of the flowpaths 136, 138, and a variety of different reversing valves 134 may be employed in accordance with one or more embodiments of the heat pump 100. As such, the present disclosure is not limited to any particular reversing valve 134, and suitable reversing valves may include, without limitation, rotating plates or housing, check valves, control valves, combinations thereof, or any other geometry or flowpath toggling or actuating devices.

In exemplary operation the heat pump 100 may initially be configured as shown in FIG. 1, with the reversing valve 134 positioned so that the heat pump 100 heats the facility 103. For illustrative purposes, this position is referred to herein as the "default" or "de-energized" position of the reversing valve 134, although the default position could, of course, be the "energized" position shown in FIG. 2.

With the reversing valve 134 in the default position (FIG. 1), the compressor 106 compresses an at least partially gaseous refrigerant and may provide compressed refrigerant via the compressor outlet 107b and the muffler 130 to the reversing valve 134. The reversing valve 134 receives the refrigerant through the first flowpath 136. The refrigerant is then directed out of the outdoor portion 104, into the indoor portion 102, and to the first heat exchanger 108. The first heat exchanger 108 then acts as a condenser for the refrigerant, condensing at least some of the gaseous portions of the refrigerant to liquid phase. During such condensing, heat is transferred from the refrigerant to the air urged past the first heat exchanger 108 by the blower 110. Accordingly, the air is warmed, thereby heating the facility 103, as the refrigerant is cooled and/or condensed.

The condensed, at least partially liquid refrigerant is then passed to one or more of the expansion devices 112, 114. For example, to avoid unnecessarily cooling the indoor portion 102, in the heating cycle of FIG. 1, the refrigerant may bypass the indoor expansion device 112 and be introduced to the outdoor expansion device 114. The refrigerant is then expanded and cooled, e.g., in the outdoor expansion device 114, and introduced to the second heat exchanger 116. The second heat exchanger 116 acts as an evaporator, transferring heat from the air moved past the second heat exchanger 116 by the fan 118 to the refrigerant. Such heat transfer may at least partially evaporate the liquid portions of the refrigerant to gaseous phase.

The at least partially gaseous refrigerant is then introduced from the second heat exchanger 116 to the reversing valve 134. The reversing valve 134 in the default position receives the refrigerant through the second flowpath 138 and directs the refrigerant to the accumulator 128. From the accumulator 128, the refrigerant may be provided to the compressor inlet 107a, restarting the cycle.

During normal operation of the heat pump 100 (i.e., with the reversing valve 134 in its default position as shown in FIG. 1), portions of the heat pump 100, for example, the second heat exchanger 116 and/or the refrigerant lines connecting other components thereto, may require defrosting. For example, the temperature sensor 142 may record the temperature of the second heat exchanger 116 and relay this information to the controller 140. The controller 140 may then compare the measured temperature with a minimum temperature to determine whether defrosting is needed. In an exemplary embodiment, the minimum temperature may be between about 30° C. and about 40° C., for example, about 35° C. Additionally or alternatively, the controller 140 may set a defrost interval timer and may initiate defrosting at the expiration of such timer. In an exemplary embodiment, the defrost interval timer may be between about 60 minutes and about 120 minutes, for example, about 90 minutes.

The controller 140 may provide the defrosting cycle by energizing the reversing valve 134, such that the flow of refrigerant in the heat pump 100 reverses, as shown in FIG. 2. With the reversing valve 134 in the energized position of FIG. 2, warm, higher-pressure refrigerant is routed from the compressor outlet 107b to the second heat exchanger 116 (e.g., via the muffler 130). The warm refrigerant may thus increase the temperature of the second heat exchanger 116, such that the second heat exchanger 116 now acts as a condenser, rather than an evaporator. From the second heat exchanger 116, the refrigerant may bypass the outdoor expansion device 114 to avoid unnecessary cooling of the outdoor portion 104 and may be expanded in the indoor expansion device 112. The refrigerant may then be provided to the first heat exchanger 108, which may now act as an evaporator. In an exemplary embodiment, the controller 140 can also energize auxiliary heater 139 to ensure that the loss of heat from indoor portion 102 to the refrigerant flow through the first heat exchanger 108 does not result in "cold blow."

Accordingly, the refrigerant can absorb heat from the air urged by the blower 110 past the first heat exchanger 108. The refrigerant can then be routed from the first heat exchanger 108, through the second flowpath 138 of the reversing valve 134, to the accumulator 128, and back to the compressor 106, where the refrigerant is compressed, and thus further warmed, and fed back to the second heat exchanger 116, warming the second heat exchanger 116 and beginning the defrost cycle again. Accordingly, such defrost cycle can serve to warm the second heat exchanger 116 (or the first heat exchanger 108 in cooling applications whereby the configuration of FIG. 1 is the defrost cycle).

Figure 3:
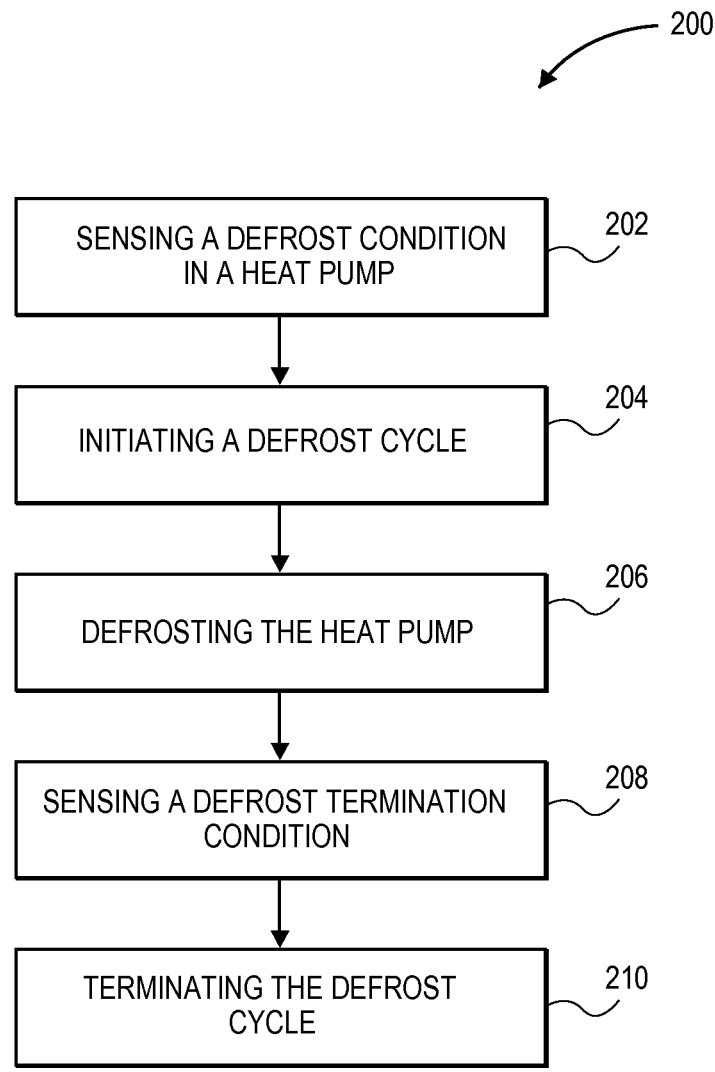
FIG. 3 illustrates a flowchart of a method for reducing perceived defrost noise in a heat pump, according to an embodiment.
Figure 4:
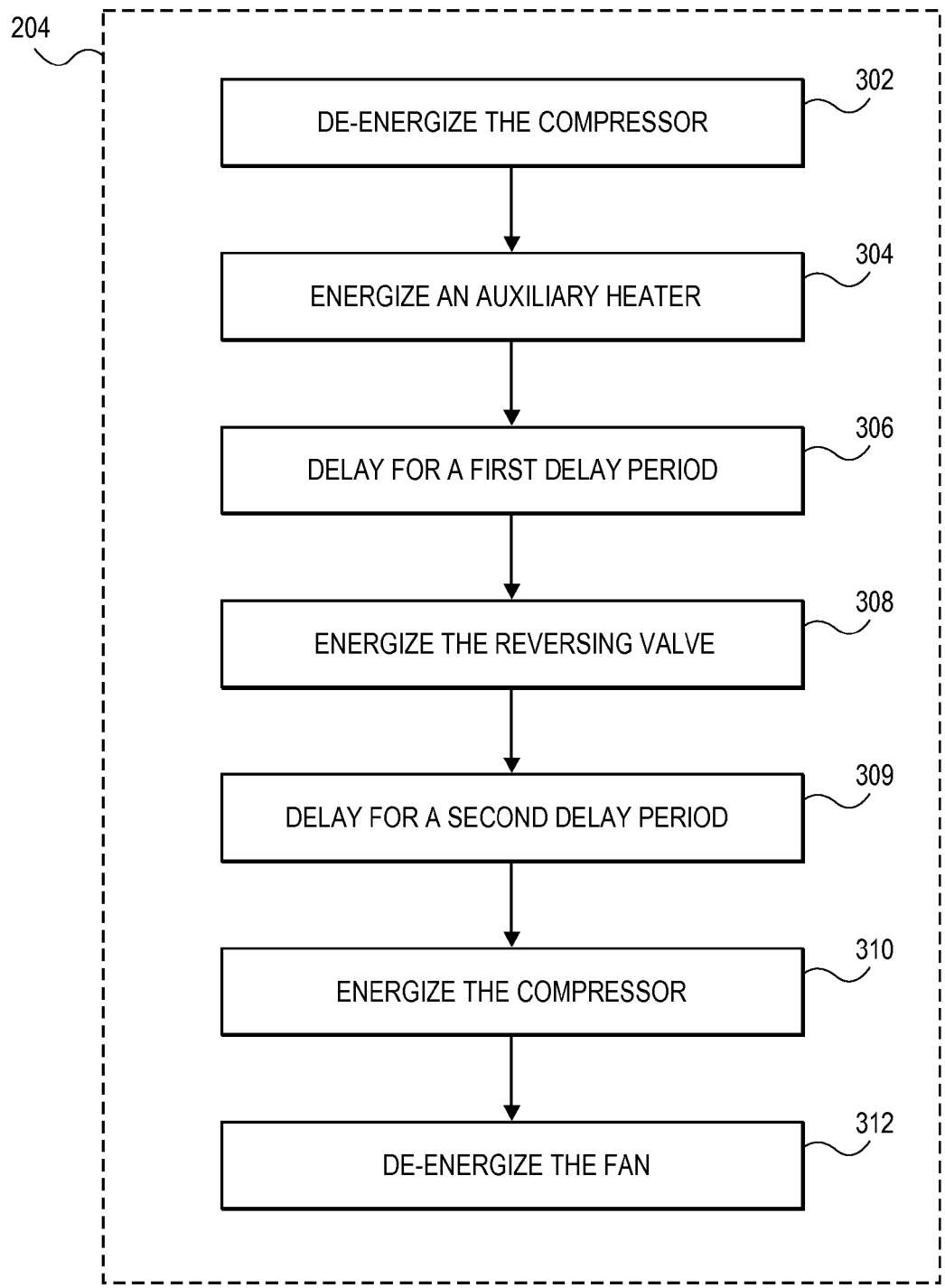
FIG. 4 illustrates a flowchart of initiating a defrost cycle, according to an embodiment.
Figure 5:
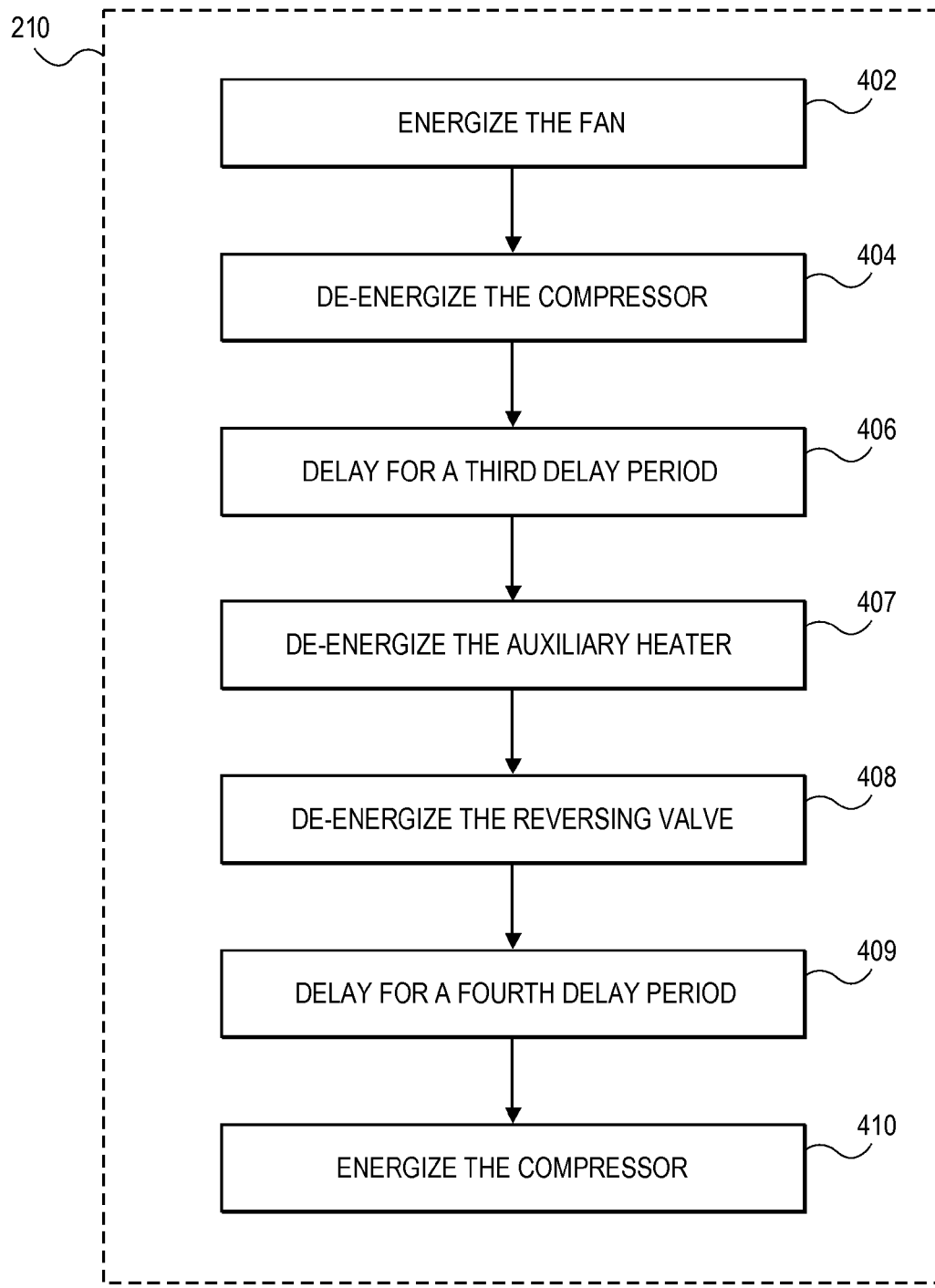
FIG. 5 illustrates a flowchart of terminating the defrost cycle, according to an embodiment.

With continuing reference to FIGS. 1 and 2, FIG. 3 illustrates a flowchart of an exemplary embodiment of a method 200 for reducing perceived noise associated with initiating and/or terminating the defrost cycle of one or more embodiments of the heat pump 100. The method 200 may be performed using the controller 140, according to an embodiment. The method 200 may generally include sensing a defrost condition, as at 202. The defrost condition may be one or more of a defrost interval timer expiring and a temperature measurement from the temperature sensor 142 recording a temperature below desired minimum temperature.

The method 200 may also generally include initiating a defrost cycle, as at 204. In at least one embodiment, initiating at 204 may proceed by energizing and thus reversing the position of the reversing valve 134, such that refrigerant in the heat pump 100 reverses direction, as described above. Initiating at 204 may include reducing the perceived noise associated with reversing the reversing valve 134, as will be described in greater detail below. The method 200 may then proceed to defrosting the heat pump 100, as at 206, for example, using warmed refrigerant to heat the components of the heat pump 100 that could potential drop to too low of a temperature, for example, the second heat exchanger 116.

The method 200 may also include sensing a defrost termination condition, as at 208, so as to avoid unnecessarily prolonged defrost cycles. The defrost termination condition may be at least one of a defrost cycle interval timer expiring and a temperature of the temperature sensor 142 recording a temperature that is at or above a target. Once the defrost termination condition is satisfied, the method 200 may proceed to terminating the defrost cycle, as at 210. Terminating at 210 may include de-energizing or otherwise reversing the reversing valve 134 back to its default condition. Moreover, terminating at 210 may also include reducing the perceived noise associated with reversing the reversing valve 134.

With continuing reference to FIGS. 1-3, FIG. 4 illustrates an exemplary embodiment of initiating the defrost cycle, as at 204, of the method 200. Initiating the defrost cycle at 204 may begin by de-energizing the compressor 106, as at 302. Simultaneously or thereafter, initiating at 204 may proceed to energizing the auxiliary heater 139, as at 304, for example, to avoid sending cold air into the facility 103 with the blower 110. In various embodiments, energizing (and de-energizing, as will be described below) the auxiliary heater 139 at 304 may proceed by directly changing a state of a relay or switch; however, in some other embodiments, the controller 140 may signal to another board or system, for example, a system user interface, by advising defrost initiation status. This second board or system may then control the power state of the auxiliary heater 139.

In at least one embodiment, initiating the defrost cycle at 204 may include delaying for a period between de-energizing the compressor 106 at 302 and energizing the auxiliary heater 139 at 304. The period of delay between de-energizing the compressor 106 at 302 and energizing the auxiliary heater 139 at 304 may range from about 1 second to about 100 seconds, about 10 seconds to about 75 seconds, about 20 seconds to about 60 seconds, or about 30 seconds to about 50 seconds, or may be about 40 seconds.

After de-energizing the compressor 106 at 304, for example, after both de-energizing the compressor 106 at 302 and energizing the auxiliary heater 139 at 304, initiating the defrost cycle at 204 may include delaying for a first delay period, as at 306. During normal, non-defrost, operation of the heat pump 100, the fan 118 may be energized, and thus circulating air and may continue running during the first delay period. Delaying at 306 thus enables the fan 118 to run for a time while the compressor 106 is de-energized. This serves to warm the cold refrigerant in the second heat exchanger 116 without continual compression by the compressor 106, thereby reducing the compression ratio of the refrigerant in the heat pump 100. In various embodiments, the first delay period may be between about 1 second and about 100 seconds, about 5 seconds and about 60 seconds, or about 10 seconds and about 30 seconds. In at least one embodiment, the first delay period may be about 20 seconds.

At the expiration of the first delay period, initiating the defrost cycle at 204 may then proceed to energizing the reversing valve 134, as at 308. Energizing the reversing valve at 308 may include switching the reversing valve 134 from its default position (e.g., FIG. 1) to its energized position (e.g. FIG. 2). The reduction in the pressure differential in the refrigerant provided by the fan 118 being on during the first delay period may provide a reduced overall noise caused by reversing the reversing valve 134, as the reduced pressure differential results in a lower flow rate of the refrigerant in the high-pressure side toward the refrigerant in the low-pressure side of the heat pump 100.

After energizing the reversing valve 134 at 308, initiating the defrost cycle at 204 may proceed to delaying for a second delay period, as at 309, with the fan 118 remaining energized. Delaying at 309 with the fan 118 and the reversing valve 134 energized may allow for the white noise of the fan 118 to mask any continued sounds caused by the refrigerant flow rushing past the reversing valve 134. For example, the second delay period may be between about 1 second and about 60 seconds, between about 3 seconds and about 40 seconds, between about 5 seconds and about 20 seconds, or between about 10 seconds and about 15 seconds. In at least one embodiment, the second delay period may be about 10 seconds. By including both the first and second delay periods in the method 200, the fan 118 serves to reduce the noise created by and mask residual noise produced by energizing the reversing valve at 308, thereby reducing the total overall perceived noise, according to an embodiment. Initiating at 204 may then proceed to energizing the compressor 106, as at 310. With the reversing valve 134 in the energized configuration, energizing the compressor 106 at 310 may serve to begin heating and circulating the refrigerant in the reverse direction in the heat pump 100.

The fan 118 may be de-energized prior to energizing the compressor 106 at 310, for example, concomitantly with energizing the reversing valve 134 at 308; however, in at least one embodiment, the fan 118 may be energized while energizing the compressor 106 at 310. In the latter embodiment, leaving the fan 118 energized while energizing the compressor 106 at 310 may further mask start up noise associated with energizing the compressor 106 at 310. Accordingly, in at least one embodiment, after energizing the compressor 106 at 310, for example, after a period of time after energizing the compressor 106 at 310, the fan 118 may be de-energized, as at 312. The period of time that may elapse between energizing the compressor 106 at 310 and de-energizing the fan 118 at 312 may be between about 1 second and about 30 seconds, between about 2 seconds and about 15 seconds, or between about 3 seconds and about 10 seconds. In at least one embodiment, the period of time may be about 5 seconds. Further, de-energizing the fan 118 at 312, may slow or halt the motivation of the air past the second heat exchanger 116, such that the heat from the warm refrigerant coursing through the second heat exchanger 116 may be provided primarily to the second heat exchanger 116 structure, rather than transferred to the air, thus speeding the defrosting of the second heat exchanger 116. However, it will be appreciated that in some cases, it may be desired to continue powering the fan 118 during some or all of the defrost cycle.

With continuing reference to FIGS. 1, 2, and 3, FIG. 5 illustrates terminating the defrost cycle, as at 210, of the method 200, according to an embodiment. Terminating at 210 may begin by energizing the fan 118, as at 402, so as to re-commence motivating air to travel past the second heat exchanger 116. Immediately or after a period of time, terminating at 210 may proceed to de-energizing the compressor 106, as at 404. For example, the period of time may be between about 1 second and about 60 seconds, between about 3 seconds and about 40 seconds, between about 5 seconds and about 20 seconds, or between about 7 seconds and about 15 seconds. In at least one embodiment, the period of time may be about 10 seconds.

After de-energizing the compressor 106 at 404, terminating at 210 may include delaying for a third delay period, as at 406, so as to allow the fan 118 to run while the compressor 106 is de-energized. By running the fan 118 while the compressor 106 is de-energized, the pressure ratio in the heat pump 100 may be reduced, as noted above, thereby reducing the potential energy of the refrigerant. In various embodiments, the third delay period may be between about 5 second and about 120 seconds, between about 15 seconds and about 100 seconds, between about 30 seconds and about 90 seconds, or between about 50 seconds and about 70 seconds. In at least one embodiment, the third delay period may be about 60 seconds. In at least one other embodiment, the third delay period may be between about 20 seconds and about 40 seconds, for example, about 30 seconds.

Terminating as at 210 may also include de-energizing the auxiliary heater 139, as at 407, for example, during or after the third delay period. Terminating at 210 may also include de-energizing the reversing valve 134 at 408, after the third delay period. In one embodiment, de-energizing the auxiliary heater 139 at 407 may proceed concomitantly with de-energizing the reversing valve 134 at 408. In another embodiment, de-energizing the auxiliary heater 139 at 407 may begin during the third delay period, for example, at about the half-way point of the third delay period, while de-energizing the reversing valve 134 at 408 proceeds after the completion of the third delay period. As noted above, running the fan 118 with the compressor 106 de-energized reduces the pressure ratio and thus the potential energy of the refrigerant in the heat pump 100. Accordingly, the flow rate of the higher-pressure refrigerant urged toward the lower-pressure side of the heat pump 100 is reduced, thereby reducing noise in the heat pump 100.

Terminating at 210 may also include delaying for a fourth delay period, as at 409, with the fan 118 energized and the reversing valve 134 de-energized. By continuing to run the fan 118 while de-energizing the reversing valve 134 and for the fourth delay period thereafter, noise produced by moving refrigerant is masked by the background "white noise" provided by the fan 118, thereby reducing the defrost noise perceived from outside the heat pump 100. In various embodiments, the fourth delay period may be between about 1 second and about 100 seconds, between about 10 seconds and about 60 seconds, or may be about 30 seconds. In other embodiments, the fourth delay period may be between about 1 second and about 60 seconds, between about 5 seconds and about 30 seconds, or about 10 seconds.

After delaying for the fourth delay period at 409 with the reversing valve 134 de-energized and thus back in its default position, the compressor 106 may again be energized, as at 410. Accordingly, with the reversing valve 134 de-energized and the compressor 106 energized, the heat pump 100 may be returned to its normal or default operative condition, allowing for efficient heating or cooling. The controller 140 may thus once again begin sensing for defrost conditions as at 202 again, for example, by reset the defrost interval timer and/or recommence monitoring the temperature of the second heat exchanger 116.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface being on the top surface of the workpiece, regardless of the orientation of the workpiece.

What is claimed is:

1. A method for reducing defrost noise in a heat pump, comprising: energizing a fan configured to urge a heat transfer medium across a heat exchanger; initiating a defrost cycle to warm the heat exchanger, comprising:
de-energizing a compressor fluidly coupled to the heat exchanger;
delaying for a first delay period with the fan energized and the compressor de-energized;
energizing a reversing valve after the first delay period, to reverse a flow of a refrigerant flow between the compressor and the heat exchanger, such that the refrigerant warms the heat exchanger;
delaying for a second delay period with the fan energized, the compressor de-energized, and the reversing valve energized;
energizing the compressor after the second delay period and then de-energizing the fan;
defrosting the heat pump during the defrost cycle; and
terminating the defrost cycle.

2. The method of claim 1, wherein initiating the defrost cycle further comprises energizing an auxiliary heater configured to warm a heat transfer medium urged across another heat exchanger in fluid communication with the compressor, before completing delaying for the first delay period.

3. The method of claim 1, further comprising evaporating the refrigerant with the heat exchanger prior to initiating the defrost cycle.

4. The method of claim 1, wherein the second delay period is between about 1 second and about 60 seconds.

5. The method of claim 1, wherein the second delay period is between about 10 seconds and about 15 seconds.

6. The method of claim 1, further comprising sensing defrost conditions, the defrost conditions including at least one of expiration of a defrost interval timer and a temperature of the heat exchanger falling below a minimum value.

7. The method of claim 1, wherein defrosting the heat exchanger comprises energizing the compressor after delaying for the second delay period so as to warm the heat exchanger.

8. The method of claim 1, wherein terminating the defrost cycle comprises:
energizing the fan;
de-energizing the compressor;
delaying for a third delay period with the fan energized and the compressor de-energized;
de-energizing the reversing valve after the third delay period;
delaying for a fourth delay period with the reversing valve de-energized and the fan energized; and
energizing the compressor after the fourth delay period.

9. The method of claim 8, wherein terminating the defrost cycle further comprises de-energizing an auxiliary heater before and/or during the third delay period.

10. The method of claim 8, wherein the third delay period is between about 5 seconds and about 100 seconds.

11. The method of claim 8, wherein the third delay period is about 30 seconds.

12. The method of claim 1, further comprising sensing a defrost cycle termination condition to determine when to terminate the defrost cycle, the defrost cycle termination condition comprising a temperature of the heat exchanger exceeding a target temperature, an expiration of a defrost cycle timer, or both.

13. A method for reducing defrost noise in a heat pump, comprising: energizing a fan configured to urge a heat transfer medium across a heat exchanger; initiating a defrost cycle to warm the heat exchanger, comprising:
de-energizing a compressor fluidly coupled to the heat exchanger;
delaying for a first delay period with the fan energized and the compressor de-energized;
energizing a reversing valve after the first delay period, to reverse a flow of a refrigerant flow between the compressor and the heat exchanger, such that the refrigerant warms the heat exchanger;
delaying for a second delay period with the fan energized, the compressor de-energized, and the reversing valve energized;
de-energizing the fan;
defrosting the heat pump during the defrost cycle; and
terminating the defrost cycle wherein the first delay period is between about 5 seconds and about 100 seconds.

14. The method of claim 13, wherein the first delay period is about-60 seconds.

15. A method for reducing defrost noise in a heat pump, comprising: energizing a fan configured to urge a heat transfer medium across a heat exchanger; initiating a defrost cycle to warm the heat exchanger, comprising:
de-energizing a compressor fluidly coupled to the heat exchanger;
delaying for a first delay period with the fan energized and the compressor de-energized;
energizing a reversing valve after the first delay period to reverse a flow of a refrigerant flow between the compressor and the heat exchanger, such that the refrigerant warms the heat exchanger;
delaying for a second delay period with the fan energized, the compressor de-energized, and the reversing valve energized;
energizing the compressor after the second delay period;
de-energizing the fan;
defrosting the heat pump during the defrost cycle; and
terminating the defrost cycle;
wherein terminating the defrost cycle comprises:
energizing the fan;
de-energizing the compressor;
delaying for a third delay period with the fan energized and the compressor de-energized;
de-energizing the reversing valve after the third delay period;
delaying for a fourth delay period with the reversing valve de-energized and the fan energized; and
energizing the compressor after the fourth delay period;
wherein the fourth delay period is between about 5 seconds and about 100 seconds.

16. The method of claim 15, wherein the fourth delay period is about 10 seconds.

17. The method of claim 15, wherein the fourth delay period is about 30 seconds.

18. A method for reducing defrost noise in a heat pump, comprising: energizing a fan configured to urge a heat transfer medium across a heat exchanger; initiating a defrost cycle to warm the heat exchanger, comprising:
- de-energizing a compressor fluidly coupled to the heat exchanger;
- delaying for a first delay period with the fan energized and the compressor de-energized;
- energizing an auxiliary heater configured to warm a heat transfer medium urged across another heat exchanger in fluid communication with the compressor, before completing delaying for the first delay period;
- energizing a reversing valve after the first delay period, to reverse a flow of a refrigerant flow between the compressor and the heat exchanger, such that the refrigerant warms the heat exchanger;
- delaying for a second delay period with the fan energized, the compressor de-energized, and the reversing valve energized;
- energizing the compressor after the second delay period and then de-energizing the fan;
- defrosting the heat pump during the defrost cycle; and
- terminating the defrost cycle, comprising:
- energizing the fan;
- de-energizing the compressor;
- delaying for a third delay period with the fan energized and the compressor de- energized;
- de-energizing the reversing valve after the third delay period;
- de-energizing the auxiliary heater before and/or during the third delay period;
- delaying for a fourth delay period with the reversing valve de-energized and the fan energized; and
- energizing the compressor after the fourth delay period.

19. A method for reducing defrost noise in a heat pump, comprising: energizing a fan configured to urge a heat transfer medium across a heat exchanger; initiating a defrost cycle to warm the heat exchanger, comprising:
- de-energizing a compressor fluidly coupled to the heat exchanger;
- delaying for a first delay period with the fan energized and the compressor de-energized;
- energizing an auxiliary heater configured to warm a heat transfer medium urged across another heat exchanger in fluid communication with the compressor, before completing delaying for the first delay period;
- energizing a reversing valve after the first delay period to reverse a flow of a refrigerant flow between the compressor and the heat exchanger, such that the refrigerant warms the heat exchanger;
- delaying for a second delay period with the fan energized, the compressor de-energized, and the reversing valve energized; and
- de-energizing the fan;
- defrosting the heat pump during the defrost cycle; and
- terminating the defrost cycle, comprising:
- energizing the fan;
- de-energizing the compressor;
- delaying for a third delay period with the fan energized and the compressor de-energized;
- de-energizing the reversing valve after the third delay period;
- de-energizing the auxiliary heater before and/or during the third delay period;
- delaying for a fourth delay period with the reversing valve de-energized and the fan energized; and
- energizing the compressor after the fourth delay period wherein:
- the first delay period is about 60 seconds;
- the second delay period is between about 10 seconds and about 15 seconds;
- the third delay period is about 30 seconds; and
- the fourth delay period is about 10 seconds or about 30 seconds.

* * * * *